(12) United States Patent
Roberts et al.

(10) Patent No.: US 9,944,116 B1
(45) Date of Patent: Apr. 17, 2018

(54) WHEEL TRIM ALIGNMENT SYSTEM WITH AN EMBOSSMENT

(71) Applicant: Phoenix U.S.A., Inc., Cookeville, TN (US)

(72) Inventors: Barry L. Roberts, Cookeville, TN (US); John Bella, Cookeville, TN (US)

(73) Assignee: Phoenix U.S.A., Inc., Cookeville, TN (US)

( * ) Notice: Subject to any disclaimer, the term of this patent is extended or adjusted under 35 U.S.C. 154(b) by 851 days.

(21) Appl. No.: 13/835,419

(22) Filed: Mar. 15, 2013

(51) Int. Cl.
  *B60B 7/06* (2006.01)
(52) U.S. Cl.
  CPC ...................................... *B60B 7/06* (2013.01)
(58) Field of Classification Search
  CPC .. B60B 7/14; B60B 7/06; B60B 7/061; B60B 7/065; B60B 7/066; B60B 7/068
  See application file for complete search history.

(56) References Cited

U.S. PATENT DOCUMENTS

| | | | |
|---|---|---|---|
| 1,906,307 A | | 5/1933 | Booth |
| 2,037,470 A | * | 4/1936 | Hunt ......................... B60B 7/14 301/11.1 |
| 2,491,506 A | | 12/1949 | Lyon |
| 2,652,286 A | | 9/1953 | Lyon |
| 3,001,826 A | | 9/1961 | Lyon |
| 3,092,421 A | | 6/1963 | Lyon |
| 4,240,670 A | * | 12/1980 | Zorn et al. ................ 301/35.622 |
| 4,606,582 A | * | 8/1986 | Warren ..................... 301/37.372 |
| 4,632,465 A | * | 12/1986 | Cummings ................ 301/108.4 |
| 4,787,681 A | * | 11/1988 | Wang et al. ............. 301/37.372 |
| 4,877,151 A | * | 10/1989 | Rush et al. ..................... 206/514 |
| 4,895,415 A | * | 1/1990 | Stay et al. ............... 301/37.371 |
| 4,932,724 A | * | 6/1990 | Wright ..................... 301/37.371 |
| 5,031,965 A | * | 7/1991 | Buerger ................... 301/37.371 |
| 5,048,898 A | | 9/1991 | Russell |
| 5,096,263 A | * | 3/1992 | Wright ..................... 301/37.375 |
| 5,128,190 A | | 7/1992 | Kang |
| 5,181,767 A | * | 1/1993 | Hudgins et al. ......... 301/37.375 |
| 5,193,884 A | * | 3/1993 | Sheu et al. ............... 301/37.374 |
| 5,205,614 A | * | 4/1993 | Wright ..................... B60B 7/14 301/37.374 |
| 5,205,616 A | * | 4/1993 | Wright ..................... B60B 7/14 301/108.4 |

(Continued)

FOREIGN PATENT DOCUMENTS

| | | |
|---|---|---|
| DE | 919394 | 10/1954 |
| FR | 2510045 | 1/1983 |

*Primary Examiner* — Jacob B Meyer
(74) *Attorney, Agent, or Firm* — Bradley Arant Boultd Cummings; Phillip E. Walker; Jacob W. Neu (57) ABSTRACT

A wheel trim system for attachment to a wheel of a vehicle. The wheel typically has a wheel flange and a plurality of studs with each stud shaped to engage at least one lug nut. The wheel trim system preferably comprises a wheel trim member and a fastener shaped to attach to the stud for releaseably attaching the wheel trim member to the wheel. The wheel trim member includes a trim flange, an exterior surface, an interior surface, and an embossment spaced from the trim flange. The embossment surrounds a hole shaped to receive one of the studs. The embossment is of a larger size than the lug nut and is positioned to space the wheel trim member from the lug nut when the lug nut is positioned on the stud.

11 Claims, 9 Drawing Sheets

(56) References Cited

U.S. PATENT DOCUMENTS

| | | | | |
|---|---|---|---|---|
| 5,222,785 | A | * | 6/1993 | Green .................. B60B 7/14 301/108.4 |
| 5,277,478 | A | * | 1/1994 | Wright .................. 301/37.376 |
| 5,286,093 | A | * | 2/1994 | Wright .................. 301/37.374 |
| 5,340,201 | A | * | 8/1994 | Weirs .................... 301/37.26 |
| 5,503,465 | A | * | 4/1996 | Price et al. ............. 301/37.374 |
| 5,542,750 | A | * | 8/1996 | FitzGerald ............. 301/37.376 |
| 5,645,324 | A | * | 7/1997 | Wright et al. .......... 301/37.376 |
| 5,667,281 | A | * | 9/1997 | Ladouceur ............. B60B 7/14 301/37.375 |
| 5,669,672 | A | * | 9/1997 | Wright et al. .......... 301/37.371 |
| 5,676,430 | A | * | 10/1997 | Wright et al. .......... 301/108.4 |
| 5,695,257 | A | * | 12/1997 | Wright et al. .......... 301/37.371 |
| 5,722,735 | A | * | 3/1998 | Wright et al. .......... 301/37.372 |
| 5,876,099 | A | * | 3/1999 | Irgens-Moller et al. .. 301/108.4 |
| 5,890,773 | A | | 4/1999 | Wright |
| 6,030,049 | A | * | 2/2000 | Russell .................. 301/37.375 |
| 6,082,829 | A | | 7/2000 | Chase |
| 6,254,195 | B1 | * | 7/2001 | Plumer .................. 301/37.371 |
| 6,302,494 | B1 | * | 10/2001 | DiMarco et al. ......... 301/108.4 |
| 6,318,942 | B1 | * | 11/2001 | Wieczorek ............... 411/431 |
| 6,402,253 | B1 | | 6/2002 | Nunes |
| 6,409,277 | B2 | | 6/2002 | Nunes |
| 6,419,327 | B1 | * | 7/2002 | Renshaw ................ B60B 7/04 301/37.102 |
| 6,511,132 | B1 | * | 1/2003 | Wright .................. 301/37.371 |
| 6,652,036 | B2 | | 11/2003 | Mosher |
| 6,672,678 | B1 | | 1/2004 | Nunes |
| 6,783,189 | B1 | * | 8/2004 | Russell et al. ........... 301/37.12 |
| 6,913,322 | B1 | * | 7/2005 | Allen .................... 301/37.371 |
| 7,156,470 | B1 | * | 1/2007 | Wright et al. .......... 301/108.1 |
| 7,416,259 | B2 | * | 8/2008 | Dagh .................... B60B 7/04 301/37.102 |
| 7,467,829 | B2 | * | 12/2008 | Wright et al. ........... 301/108.1 |
| 7,611,211 | B1 | * | 11/2009 | Roberts .................. 301/37.31 |
| 7,677,677 | B1 | * | 3/2010 | Roberts .................. 301/37.372 |
| 2003/0038529 | A1 | * | 2/2003 | Hsu et al. ............... 301/37.371 |
| 2005/0206220 | A1 | * | 9/2005 | Polka .................... 301/37.105 |
| 2007/0102994 | A1 | * | 5/2007 | Wright et al. .......... 301/37.373 |
| 2015/0035346 | A1 | * | 2/2015 | Wang .................... 301/37.102 |

* cited by examiner

WHEEL TRIM ALIGNMENT SYSTEM WITH AN EMBOSSMENT

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

All patents and publications described or discussed herein are hereby incorporated by reference in their entirety.

BACKGROUND OF THE INVENTION

The present disclosure relates generally to a decorative attachment for motor vehicle wheels, and more particularly to a wheel trim attachment system used as a decorative and/or protective cover, or trim, or wheel simulator for the wheels of a vehicle.

Vehicles and automobiles are the main form of transportation currently used in the United States. Various efforts have been made in the past to improve the function, use, and appearance of these vehicles both externally and internally. For example, the concept of using covers for wheels for both protective and decorative purposes is known in the art.

Various devices and structures have commonly been used to secure wheel covers to the wheels of vehicles in order to enhance the aesthetic value of the vehicle and apply a level of protection from particles and fluids entering the wheels. Since wheel covers commonly include a large number of parts which require specialized tools in order to affix the covers to the vehicle's wheels. These prior art wheel covers normally require an extended period of time for installation due to the excessive number of parts and lack of familiarity of the user with those parts.

Additionally, certain of these prior art wheel cover systems may require installation with specialized tools, which can complicate the installation process. If the specialized tools are not used correctly, installation may be improper and the cover may detach while the vehicle is in motion or fail to protect the wheel or provide an appeasing aesthetic look. Additionally, any removal, retightening, or resecuring of such prior art wheel cover systems requires the use of the specialized tool. If this specialized tool is not kept with the vehicle and wheel covers, then these prior art wheel covers are not normally removable without damaging or breaking these prior art wheel covers.

Correspondingly, if the tire or wheel with which these prior art wheel covers is damaged, the specialized tool is required for removing the prior art wheel covers in order to access the lug nuts and other vehicle wheel parts located behind the cover. As such, when the vehicle which has these prior art special covers is in need of maintenance in the wheel, axle, or brake area, the specialized tool once again is required. Again, absence of the specialized tool during remove of the prior art wheel covers normally results in damage to the prior art wheel covers.

Additionally, there have been other prior art attempts, such as U.S. Pat. Nos. 6,652,036, 6,082,829, 5,542,750, 5,340,201, and 5,031,965 that either require the wheel cover to attach directly under the lug nuts of the wheel or use some type of glue to glue the wheel cover into place. Both of these are typically undesirable. First, there are restrictions and safety issues associated with altering the attachment between the lug nuts and vehicle studs, which attaches the wheel and tire to the axle of the vehicle. As such, any attachment of a wheel cover to the wheel should not base that attachment between the contact face of the lug nuts and the surface of the wheel. Second, there is difficulty associated with the removal of wheel covers that have been glued to the wheel when maintenance is needed in the wheel, brake, tire, and axle areas.

There have still been prior art attempts to make a wheel cover that snaps into place or fits into the peripheral edge of the vehicle wheel. For example, U.S. Pat. Nos. 6,402,253, 6,409,277, and 6,672,678 are directed at wheel covers that include an outer wheel edge clip that is designed to lock into the peripheral edge of the vehicle wheel. These patents have several drawbacks in the fact that each wheel cover must be sized, normally within a small tolerance range, for each wheel to which it is placed. This restricts the use of these wheel covers to retrofit vehicles. Additionally, these wheel covers require the wheel to have an extended outer peripheral edge or have enough lip to engage specific portions of these wheel covers. Once again this can severely limit the types and numbers of wheels to which these wheel covers can be used.

Other prior art attempts have used an intermediate device to attach the wheel cover to the vehicle wheel. For example, U.S. Pat. Nos. 5,890,773, and 5,128,190 have used a ring like attachment piece. These prior art devices have deficiencies in their applicability in that these devices can be restricted in the number or variety of wheels to they will attach. Various characteristics, such as welding, in these prior art devices restricts their usefulness and applicability by limiting the number of wheels and wheel covers with which they are compatible.

As such, the current available wheel covers and their attachment systems do not provide sufficient aesthetic appeal, complicate the attachment to and removal from the wheel with either large assembly times or specialized tools, and fail to interface with sufficiently large numbers of wheels and wheel covers to have a large "universal" applicability.

What is needed then is a wheel cover and associated attachment system which reduces the number of parts used in order to securely attach the wheel cover to the vehicle. Such a cover and attachment system preferably does not require the use of specialized tools for installation or removal and reduces the number of steps in the installation process while maintaining a secure attachment of the wheel cover to the vehicle. Such a cover and attachment system preferably has a large array of wheels and wheel covers with which it operates. This needed wheel cover and attachment system is lacking in the art.

BRIEF SUMMARY OF THE INVENTION

The technology disclosed herein provides a device capable of use with numerous decorative wheel covers on a broad population of industry wheel diameters, or "universal fitment" wheel trims. The intermediary device can cover a quantity of applicable fitments and can reduce the quantity of inventoried application part numbers through these universal fitments. This device can reduce the overall cost of capital used to maintain the typical range of prior art attachment devices. The intermediary device can integrate with a wide range of decorative trims and the varied diameters of wheels found in wheels in the industry.

Disclosed herein is a wheel trim system for attachment to a wheel of a vehicle. The wheel typically has a wheel flange and a plurality of studs with each stud shaped to engage at least one lug nut.

The wheel trim system preferably comprises a wheel trim member and a fastener shaped to attach to the stud for releaseably attaching the wheel trim member to the wheel. The wheel trim member includes a trim flange, an exterior surface, an interior surface, and an embossment spaced from the trim flange. The embossment surrounds a hole shaped to receive one of the studs. The embossment is of a larger size than the lug nut and is positioned to space the wheel trim member from the lug nut when the lug nut is positioned on the stud.

The wheel trim member can further include a hub cover and a plurality of hub cover fasteners. A central opening in the wheel trim member can be shaped to accept the hub cover. A plurality of attachment holes can be positioned in the wheel trim member with each hole shaped to accept one of the hub cover fasteners to secure the hub cover to the wheel trim member.

The trim flange can be shaped and positioned to engage the wheel flange when the fastener is attached to the stud. Additionally, the interior surface can be spaced from the wheel when a fastener is attached to the stud and the trim member is releaseably attached to the wheel.

The wheel trim member can further include a plurality of stud covers spaced on the exterior surface of the wheel trim member. Each stud cover can be positioned to correspond with, and cover, one of the studs.

It is therefore a general object of the present disclosure to provide a system to attach a decorative wheel cover or trim to a wheel.

Another object of the present disclosure is to provide a wheel trim system that can attach to a wheel without removal of the fastening elements that attach the wheel to the vehicle.

Still another object of the present disclosure is to provide a wheel trim system that operates with a wide variety of wheel covers and a wide variety of wheels.

Other and further objects, features and advantages of the present disclosure will be readily apparent to those skilled in the art upon a reading of the following disclosure when taken in conjunction with the accompanying drawings.

DETAILED DESCRIPTION OF THE INVENTION

Figure 1:
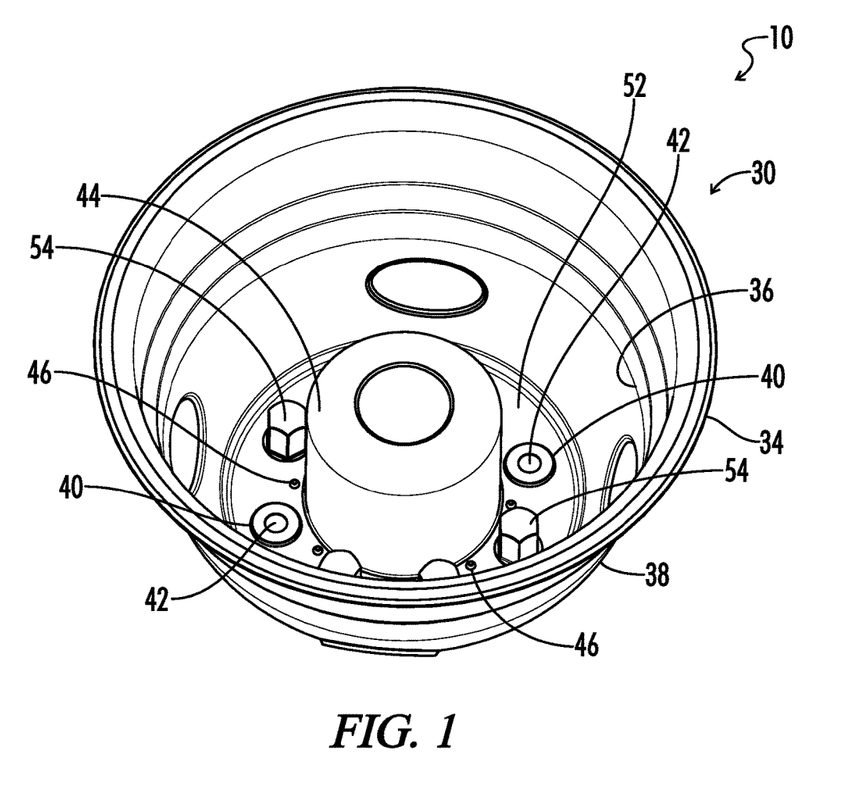
FIG. 1 is a top perspective view of a wheel trim system made in accordance with the current disclosure.
Figure 2:
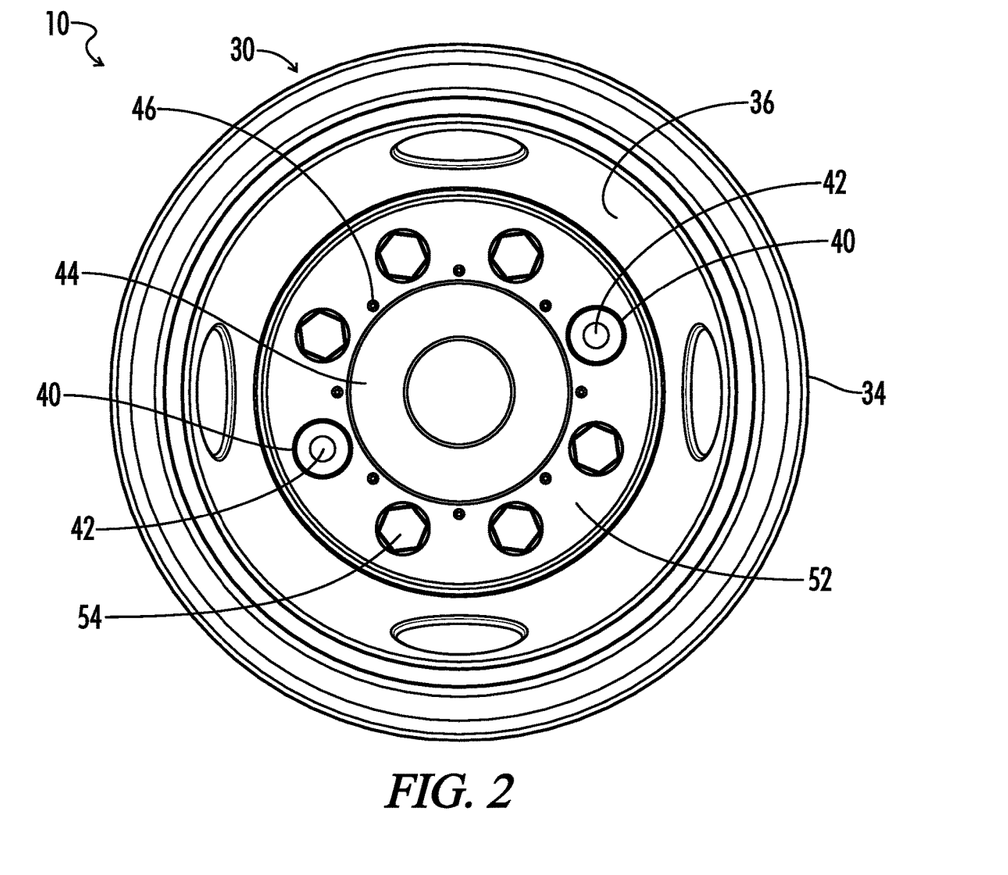
FIG. 2 is a top view of a wheel trim system made in accordance with the current disclosure.
Figure 3:
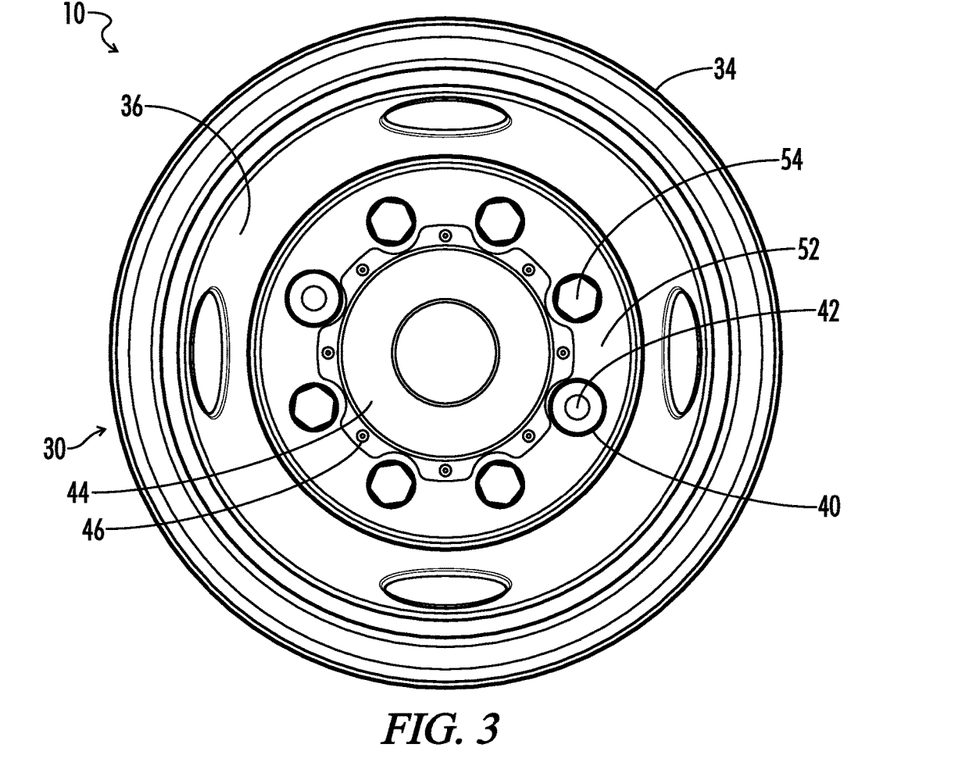
FIG. 3 is a top view of an alternate wheel trim system made in accordance with the current disclosure.
Figure 4A:
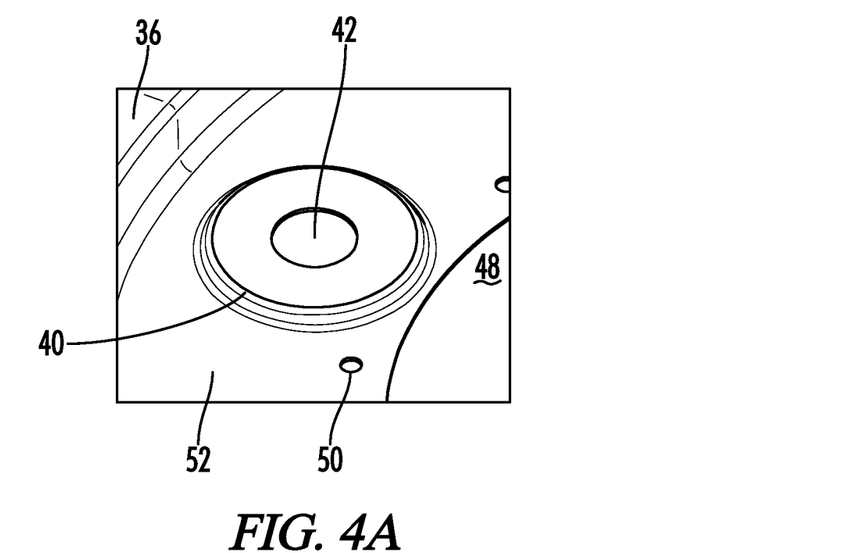
FIG. 4A is a detailed view of an embossment location made in accordance with the current disclosure.
Figure 4B:
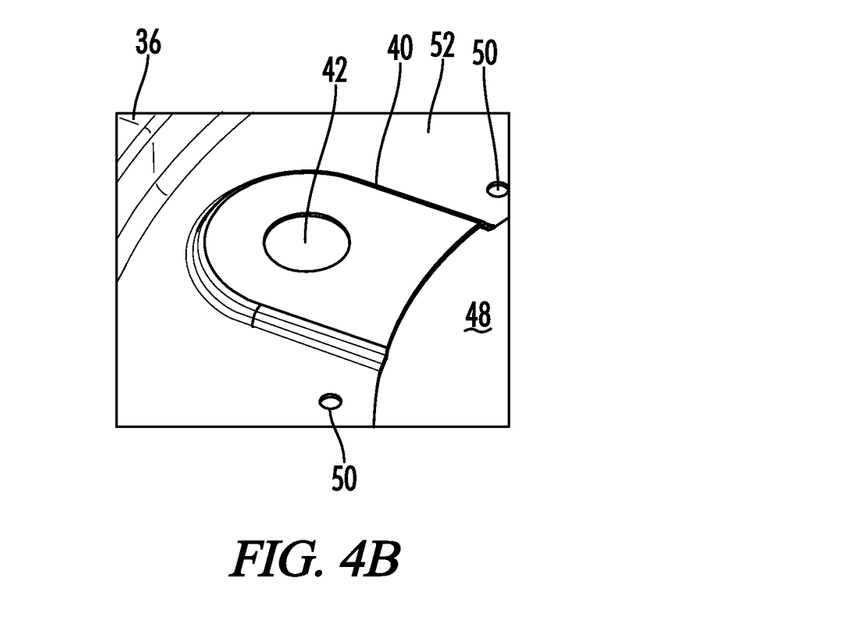
FIG. 4B is a detailed view of an alternate embossment location made in accordance with the current disclosure.
Figure 5:
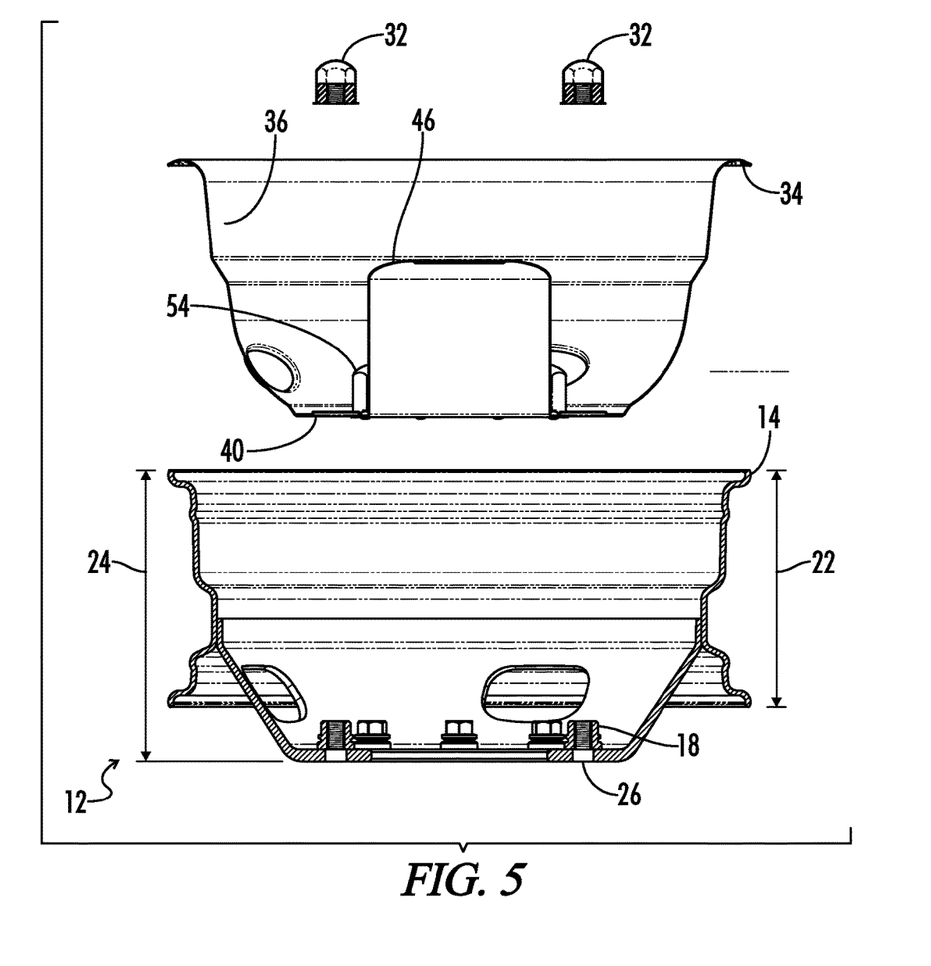
FIG. 5 is an expanded view of a wheel trim system and wheel of a vehicle in accordance with the current disclosure.
Figure 6:
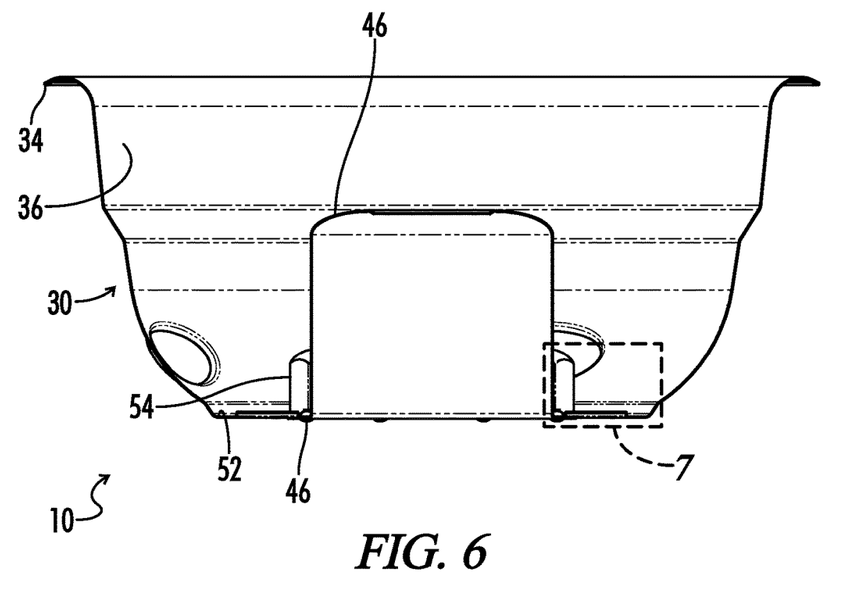
FIG. 6 is a cross-sectional view of a wheel trim system made in accordance with the current disclosure.
Figure 7:
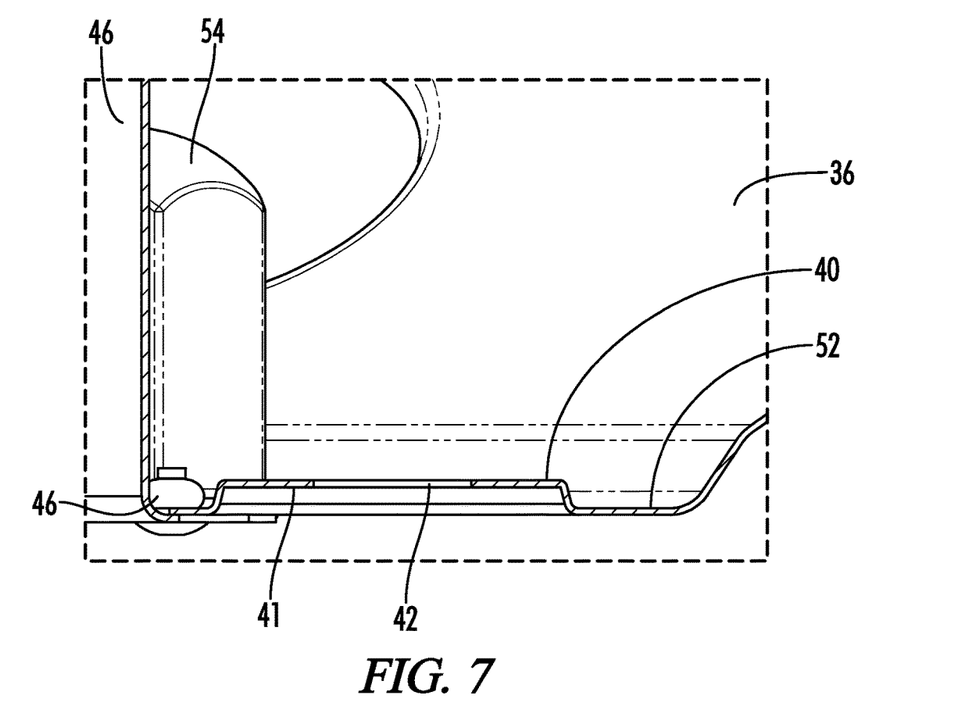
FIG. 7 is a detailed view of the area indicated as "7" in FIG. 6.
Figure 8:
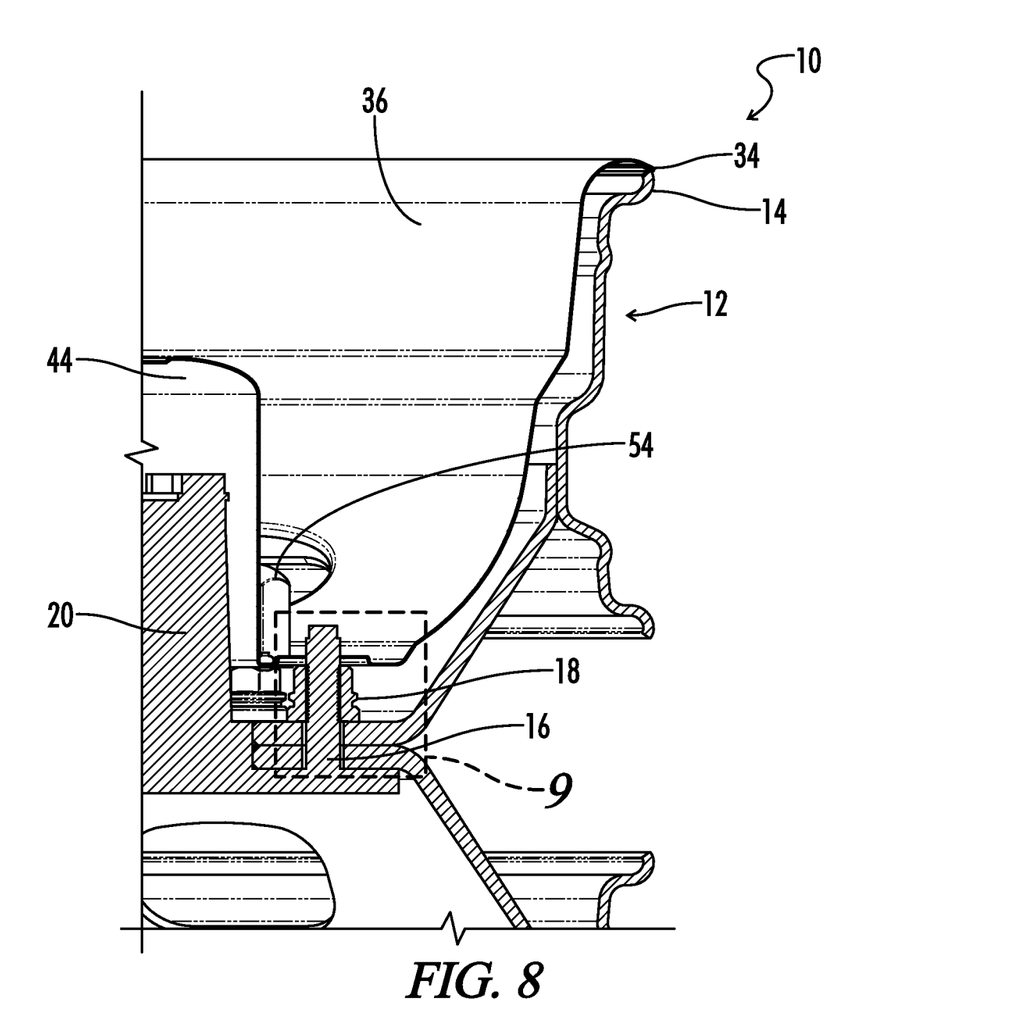
FIG. 8 is a partial cross-sectional view of a wheel trim system attached to a wheel of a vehicle made in accordance with the current disclosure.
Figure 9:
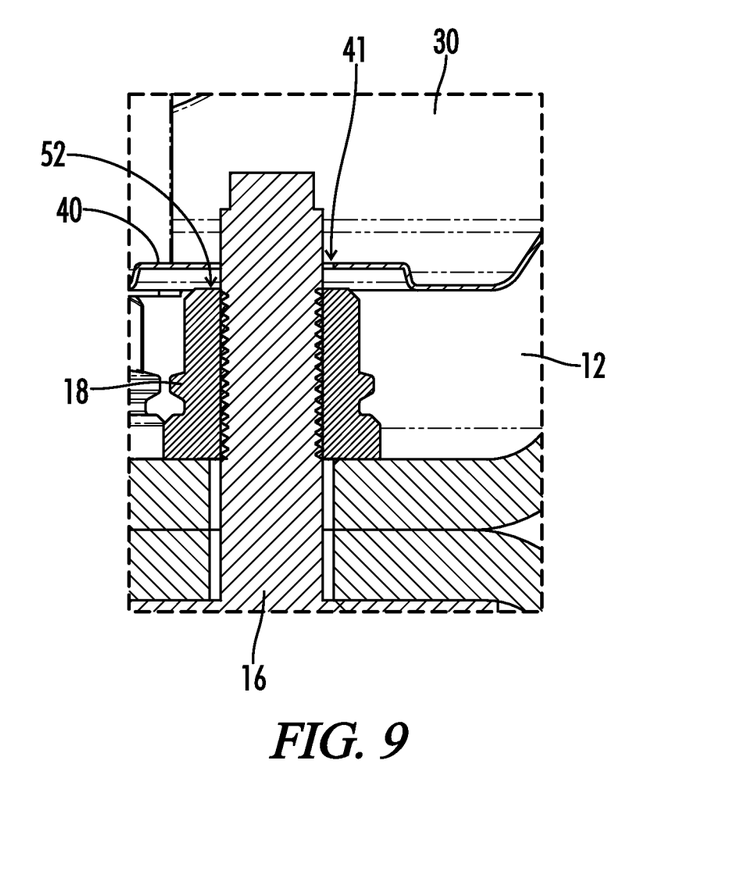
FIG. 9 is a detailed view of the area indicated as "9" in FIG. 8.

Referring generally now to FIGS. 1-9, a wheel trim system as taught by the current disclosure is shown and generally indicated by the numeral 10. The wheel trim system 10 can also be described as a wheel cover system or a wheel simulator. The wheel trim system 10 is for a wheel 12, which can also be described as a rim, that operates with a tire on which a vehicle, or automobile such as a car or truck, moves across a surface, such as a road. The wheel 12 includes a wheel flange 14 and a plurality of studs 16. Each stud 16 is shaped to engage at least one lug nut 18, or lug 18, that facilitates securing the wheel 12 to the vehicle. A hub 20 is associated with the vehicle and further facilitates the attachment of the wheel 12 to the axle of the vehicle. The wheel 12 typically includes a tire width 22 upon which the tire surrounds the wheel 12. This tire width 22 typically makes up a large portion of the overall wheel width 24 that typically extends from the wheel flange 14 to the stud attachment locations 26 where the stud 16 engaged the wheel 12.

In a primary embodiment, the wheel trim system 10 comprises a wheel trim member 30 and a fastener 32. The fastener 32 is a shape to attach to the stud 16 for releaseably attaching the trim member 30 to the wheel 12. The fastener 32 can be threaded to receive and removeably attach to the stud 16. In this embodiment, the fastener 32 can screw onto the stud and engage the wheel trim member in order to secure the wheel trim member proximate to the wheel 12.

The wheel trim member can have a trim flange 34, an exterior surface 36, an interior surface 38, and an embossment 40. The embossment 40 is spaced from the trim flange 34 and surrounds a hole 40 that is shaped to receive one of the studs 16. The embossment 40 is sized larger than one of the lug nuts 18 and is positioned to space the wheel trim member 30 from the lug nut 18 when the lug nut 18 is positioned on the stud 16.

For example, the trim flange 34 is shaped and positioned to engage the wheel flange 14 when the fastener 32 is attached to the stud 16. The location of the stud 16 through the hole 42 positions the wheel trim system 10 on the wheel 12. This can correctly position the wheel trim system 10 to adequately, and aesthetically pleasingly, represent a decorative wheel, or decorative wheel trim cover. This facilitates to mask, or hide, some of the exposed portion of the wheel when the wheel is installed on the vehicle.

The wheel trim member 10 can further include a hub cover 44 and a plurality of hub cover fasteners 46. The wheel trim member 10 can include a central opening 48 shaped to accept the hub cover 44 while a plurality of attachment holes 50 can be spaced around the central opening 48. Each attachment hole 50 can be shaped to accept one of the hub cover fasteners 46 to secure the hub cover 44 to the wheel trim member 30.

In one embodiment, the trim flange 34 is shaped in position to engage the wheel flange 14 to facilitate an aesthetically pleasing look for the wheel trim system 10. This engagement can occur when the fastener 32 is attached to the stud 16 to secure the wheel trim system 10 in place on the wheel 12. In this position, the interior surface 38 can be spaced from the wheel 12. This positioning of the wheel flange 14 and trim flange 34 along with the spacing between the interior surface 38 and the wheel 12 and the engagement of the fastener 32 to the stud 16 facilitates positioning of the wheel trim system 10 on a variety of wheels of somewhat varying configuration.

This positioning is further facilitated by the embossment 40, which can be described as a detent, or depression, in the face 52 of the wheel trim member 30. The embossment 40 allows variance in the location, and tolerances of the stud 16 and lug nut 18 in relation to the embossment 40 and hole 42. This facilitates the use of the wheel trim system 10 on a variety of wheels 12. In use, there can be a gap created between the surface 41 of the embossment 40 and the outside surface 19 of the lug nut 18. This coupled with the preferred size of the embossment 40 being larger than the lug nut 18 creates variance and allowable tolerances in the use of the wheel trim system 10 to attach to various wheels 12.

The wheel trim member 30 can further include a plurality of stud covers 54 that are spaced around the exterior surface 36, preferably proximate to or on the face 52, of the wheel trim member 30. These stud covers 54 are positioned to correspond with, and cover, one of the studs 16 and any associated lug nut 18 thereon. The stud covers 54 are preferably made a part of the wheel trim member 30 and do not remove like the fasteners 32.

In an embodiment, there are at least two embossments 40 positioned on the face 52 of the wheel trim member 30. These embossments 40 can be positioned on opposite sides of the face 52 to facilitate attachment of the wheel trim system 10 with the fasteners 32 to the wheel 12. Additionally, there are a plurality of stud covers 54 with one stud cover corresponding to each stud 16 and lug nut 18 not engaged by a fastener 32. In a most preferred embodiment, there are six stud covers 54 that are positioned on the face 52 to correspond with the six studs 16 and lug nuts 18. This is due to the fact that a typical wheel attachment has eight studs and lug nuts. Other numbers of studs and lug nuts can vary as desired and as known in the art and are contemplated within the scope of this disclosure.

Thus, although there have been described particular embodiments of the present invention of a new and useful Embossed or Detent Wheel Trim Alignment System it is not intended that such references be construed as limitations upon the scope of this invention except as set forth in the following claims.

What is claimed is:

1. A wheel trim system for attachment to a wheel of a vehicle, the wheel having a wheel flange and a plurality of studs, each stud attached to the wheel at a stud attachment location and shaped to engage at least one lug nut, the wheel trim system comprising:
    a wheel trim member having a trim flange, an exterior surface, an interior surface, a plurality of holes with each hole shaped to receive one of the studs, and an embossment spaced from the trim flange, the embossment surrounding just one hole of the plurality of holes, the embossment sized larger than the lug nut and raised away from the stud attachment location and towards the trim flange, the embossment thereby positioned to space the wheel trim member from the lug nut without contact therebetween when the lug nut is positioned on the stud and engaged with the wheel; and
    a fastener shaped to attach to the stud for releasably attaching the trim member to the wheel.

2. The system of claim 1, the wheel trim member further including a hub cover.

3. The system of claim 1, the wheel trim member further including two embossments, each embossment spaced from the other embossment and having a hole shaped to receive one of the studs.

4. The system of claim 1, wherein the trim flange is shaped and positioned to engage the wheel flange when the fastener is attached to the stud.

5. The system of claim 4, wherein the interior surface is spaced from the wheel when the fastener is attached to the stud and the trim member is releasably attached to the wheel.

6. The system of claim 1, the wheel trim member further including a plurality of stud covers spaced on the exterior surface, each stud cover positioned to correspond with and cover one of the studs.

7. The system of claim 1, wherein the fastener is threaded to receive and removably attach to one of the studs.

8. A wheel trim system for attachment to a wheel of a vehicle, the wheel having a wheel flange and a plurality of studs, each stud attached to the wheel at a stud attachment location and shaped to engage at least one lug nut, the wheel trim system comprising:
    a wheel trim member having an exterior trim flange, an exterior surface, an interior surface, at least two holes with each hole shaped to receive one of the studs, and at least two embossments, with each embossment surrounding just one respective hole, each embossment spaced from the exterior trim flange, each embossment sized larger than one of the lug nuts and raised away from the stud attachment location and towards the trim flange, and each embossment thereby positioned to space the wheel trim member from one of the lug nuts without contact therebetween when said lug nut is positioned on one of the studs and engaged with the wheel; and
    at least two threaded fasteners, each fastener shaped to attach to one of the studs for releasably attaching the trim member to the wheel.

9. The system of claim 8, the wheel trim member further including a hub cover.

10. The system of claim 8, wherein the exterior trim flange is shaped and positioned to engage the wheel flange and the interior surface is spaced from the wheel when the fastener is attached to the stud and the trim member is releasably attached to the wheel.

11. The system of claim 8, the wheel trim member further including a plurality of stud covers spaced on the exterior surface, each stud cover positioned to correspond with and cover one of the studs.

* * * * *